(12) United States Patent
Williams et al.

(10) Patent No.: US 8,152,911 B1
(45) Date of Patent: Apr. 10, 2012

(54) VENTLESS TANK SYSTEM

(76) Inventors: Michael E. Williams, Norman, OK (US); Johnnie E. Melton, Anadarko, OK (US); Tony E. Melton, Anadarko, OK (US)

( * ) Notice: Subject to any disclaimer, the term of this patent is extended or adjusted under 35 U.S.C. 154(b) by 168 days.

(21) Appl. No.: 12/751,702

(22) Filed: Mar. 31, 2010

Related U.S. Application Data

(60) Provisional application No. 61/165,202, filed on Mar. 31, 2009.

(51) Int. Cl.
*B01D 19/00* (2006.01)

(52) U.S. Cl. ............... 96/184; 96/194; 95/248; 95/253; 95/260; 95/266

(58) Field of Classification Search .............. 96/184, 96/193, 194; 95/247, 248, 249, 253, 260, 95/266
See application file for complete search history.

(56) References Cited

U.S. PATENT DOCUMENTS

| | | | |
|---|---|---|---|
| 3,360,903 A * | 1/1968 | Meyer ........................ | 96/157 |
| 5,900,137 A * | 5/1999 | Homan ....................... | 210/85 |
| 6,214,092 B1 * | 4/2001 | Odom et al. .................. | 95/253 |
| 6,537,458 B1 * | 3/2003 | Polderman ................... | 210/801 |
| 7,198,659 B1 * | 4/2007 | Fanguy ....................... | 95/267 |
| 2007/0175331 A1 * | 8/2007 | Tomshak et al. ............... | 96/204 |

* cited by examiner

*Primary Examiner* — Duane Smith
*Assistant Examiner* — Douglas Theisen
(74) *Attorney, Agent, or Firm* — Tomlinson Rust McKinstry Grable

(57) ABSTRACT

A tank system for capturing fluids from an oil or gas well. The system comprises a trailer, a tank body supported on the trailer, a separator supported on the trailer, and a sand trap supported on the trailer. The tank includes a gas buster line and a flare line. The tank body has a main inlet port at a top of the tank body and a vent port on a top of the tank body. The gas buster line is disposed in the tank body and is connected to the main inlet port. The gas buster line has multiple lengths of pipe sections, each pipe section increasing in length and diameter. The last section of the gas buster is characterized by a plurality of slots cut in a circumference of the pipe section to allow fluids in the gas buster line to disperse into the tank. The flare line is operatively connected to the vent port and includes an igniter to burn gases before they are vented to the atmosphere. The sand trap and the separator can be used as conditions require to treat fluids from a well before the fluids enter the tank.

7 Claims, 3 Drawing Sheets

VENTLESS TANK SYSTEM

CROSS REFERENCE TO RELATED APPLICATIONS

This application claims the benefit of U.S. Provisional Application No. 61/165,202 filed Mar. 31, 2009, the contents of which are incorporated fully herein by reference.

FIELD OF THE INVENTION

The present invention relates to the field of oil and gas wells, and more particularly to vessels or tanks for capturing fluids and gases from a well.

SUMMARY OF THE INVENTION

In one embodiment the present invention is directed to a tank system for capturing fluids from a well. The system comprises a tank body, a gas buster line and a flare line. The tank body comprises a main inlet port proximate a top portion of the tank body and a vent port disposed on a top of the tank body. The gas buster line disposed within the tank body, the line comprising a first pipe section having a length and a diameter and a second pipe section having a length and a diameter. The first pipe section is connected at a first end to the main inlet port and the second pipe section is connected at a first end to a second end of the first pipe section. The length of the second pipe section is greater than the length of the first pipe section and the diameter of the second pipe section is greater than the diameter of the first pipe section. The second pipe section is characterized by a plurality of slots cut in a circumference of the pipe section, the slots allowing fluids in the second pipe section to disperse out of the second pipe section. The flare line is operatively connected to the vent port. The flare line comprises at least one pipe section having an end connected to the vent port, a check valve connected to the at least one pipe section, and an ignition system connected to the at least one pipe section and adapted to burn gases passing through the at least one pipe section.

In an alternative embodiment the present invention is directed to a tank system for capturing fluids from a well. The system comprises a trailer, a tank body supported on the trailer, a gas buster line, a flare line, a pipe section having a first end connected to the main inlet port, a separator supported on the trailer, and a sand trap supported on the trailer. The tank body comprises a main inlet port proximate a top portion of the tank body and a vent port disposed on a top of the tank body. The gas buster line disposed within the tank body, the line comprising a first pipe section having a length and a diameter and a second pipe section having a length and a diameter. The first pipe section is connected at a first end to the main inlet port and the second pipe section is connected at a first end to a second end of the first pipe section. The length of the second pipe section is greater than the length of the first pipe section and the diameter of the second pipe section is greater than the diameter of the first pipe section. The second pipe section is characterized by a plurality of slots cut in a circumference of the pipe section, the slots allowing fluids in the second pipe section to disperse out of the second pipe section. The flare line is operatively connected to the vent port. The flare line comprises at least one pipe section having an end connected to the vent port, a check valve connected to the at least one pipe section, and an ignition system connected to the at least one pipe section and adapted to burn gases passing through the at least one pipe section. The separator has an inlet port and an outlet port, where the outlet port is operatively connected to a second end of the pipe section connected to the main inlet port. The sand trap has an inlet port and an outlet port, where the outlet port operatively connected to inlet port of the separator.

DETAILED DESCRIPTION OF THE DRAWINGS

The present invention is directed to a tank system for handling fluids and gases extracted from a well. The system design allows the operator of an oil or gas well to flow the well into the tank without the possibility of harmful vapors escaping unburned to the atmosphere. The system includes a pressure rated vessel and incorporates safety relief valves to insure the structural integrity of the vessel is not compromised by over pressuring or over vacuuming. Safety valves are incorporated in both standard and inverted form to increase the safety features. Gases from the tank are vented through a flare stack with an ignition source to burn gases before hitting the atmosphere. The system also incorporates gas separator and sand trap technology to increase functionality.

Figure 1:
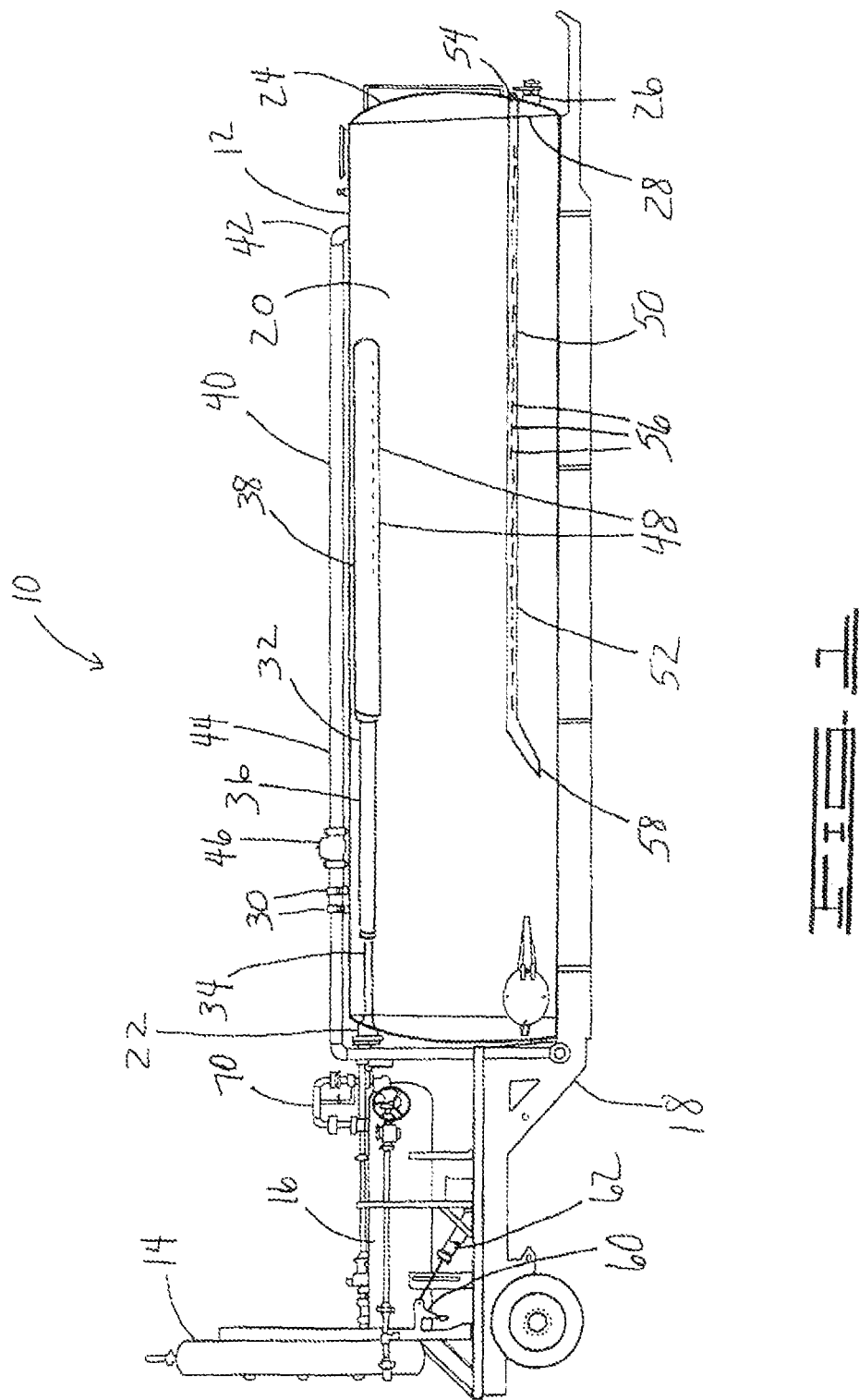
FIG. 1 is a side view of a ventless tank system built in accordance with the present invention.

Turning to the drawings in general and FIG. 1 in particular, there is shown therein a ventless tank system 10 built in accordance with the present invention. The system 10 comprises a ventless tank 12, a sand trap 14, and a three-phase separator 16 adapted to handle fluids, oil, gas, or other induced fluids. Preferably, the tank 12, the sand trap 14, and the three-phase separator 16 are all supported on a trailer 18 suitable for towing by a vehicle. The system 10 is arranged on the trailer 18 for connection to a well head (not shown). Preferably, the well head connection would be a type 1502 flow riser, though other connections are anticipated. Gas or fracturing fluid would enter the system 10 through the riser and be routed through components of the system.

The tank 12 comprises a high pressure vessel or tank body 20 disposed to receive expellants from the well under high pressure. The tank body 20 is operatively connected to the well head through the flow riser. The tank body 20 comprises a main inlet port 22 disposed proximate a top portion 24 of the tank body for connection to the flow riser. The main inlet port 22 will preferably be connected to the flow riser through a series of pipe connections, yet to be described. The series of pipe connections will allow fluids from the well head to go directly to the tank 12, or through the sand trap 14 or the three-phase separator 16 as conditions necessitate.

Figure 2:
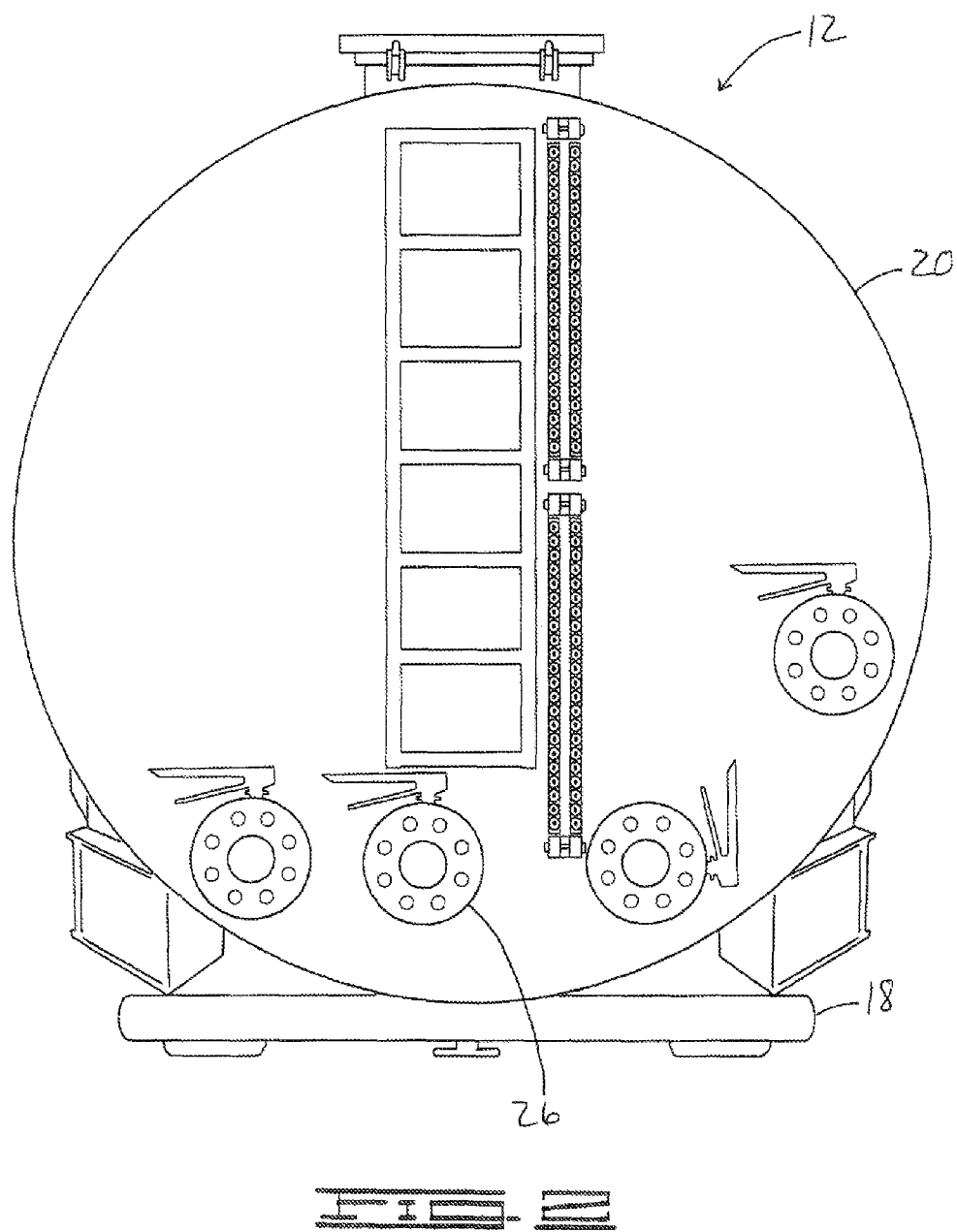
FIG. 2 is a rear elevation of the tank body system of FIG. 1.

Referring now to FIG. 2, the tank body 20 also comprises at least one drain 26 adapted to allow fluids from the tank 12 to be pumped from the tank body. The tank body 20 may further comprise a plurality of pop off valves, manways, and cleanouts to facilitate use. With reference again to FIG. 1, the preferred embodiment the tank body 20 comprises a plurality of 4 inch suction lines mounted in a lower portion 28 of a front of the tank to allow for fluid to be removed from the tank via vacuum truck (not shown). A sump is preferably disposed directly behind the ends of the suction lines to prevent sand plugging the lines exiting the tank. The tank body 20 also preferably comprises two 25 psi inverted safety relief valves 30 to insure that the tank is not collapsed during vacuum procedures.

With continued reference to FIG. 1, the tank 10 further comprises a gas buster line 32 adapted to assist separating gas from the fluids. The buster line 32 is disposed within the tank body 20 and operatively connected to the main inlet port 22. Preferably, the gas buster line 32 comprises an elongate cylindrical line to be disposed horizontally within the tank body 20. More preferably, the gas buster 32 comprises a plurality of cylindrical pipes of increasing diameter. As shown in the preferred embodiment of FIG. 1, the gas buster line 32 comprises three cylindrical pipes. A first pipe is 34 connected at a first end to the inlet port 22 and preferably has a diameter substantially similar to that of the inlet port. A second pipe 36, having a slightly larger diameter than the first pipe 34, is connected at a first end to a second end of the first pipe. A third pipe 38, having a diameter larger than the second pipe 36, is connected to a second end of the second pipe. The third pipe 38 comprises a plurality of slots 48 to let fluid from the line disperse into the tank. Preferably, the first pipe 34 is a 3 foot length of 4" diameter pipe; the second pipe 36 is a 10 foot length of 6" diameter pipe; and the third pipe 38 is a 10 foot length of 10" diameter pipe. One skilled in the art will appreciate the increase in diameters of the pipes allows the high pressure fluids to be captured appropriately in the tank.

As the fluids are dispersed under pressure into the tank 12 from the gas buster line 32, gas will separate from fracturing fluids as gas particulates will rise in the tank and fluids will settle to a bottom of the tank. With continued reference to FIG. 1, the tank 12 further comprises a flare line 40 adapted to collect and burn gases before the gases are vented to the atmosphere. The flare line 40 is connected to the tank body 20 at a vent port 42 on a top side of the tank body 20. The flare line 40 comprises an elongate pipe section 44 that runs along a top portion of the tank body 20. Preferably, the flare line 40 will comprise a 6" pipe. A check valve 46 is disposed in the flare line to insure gas and liquids in the flare line do not flow back into the tank body 20. The flare line 40 is connected to a remotely situated piloted ignition system adapted to burn gases passing through the flare line. Preferably, the ignition system for burning the gases is maintained 100 feet from the tank system. More preferably, a redundant electronic ignition system is disposed as a backup to the piloted system. Gas particulates that rise in the tank 12 will flow to the vent port 42 and through the flare line 40. Consequently, $H_2S$ or other gases in the tank 12 can be safely burned off without venting the gases to the atmosphere.

The tank 12 further comprises a blending gel line 50 adapted to roll the fluids that have settled in the tank body 20 and to mix the fluids with chemicals. The gel line comprises an elongate pipe 52 disposed within the tank body 20, proximate a bottom portion 28 of the tank body. The gel line 50 is connected at a first end to a manifold port 54 on the tank body 20. Preferably, the pipe 52 comprises a plurality of slots 56 around a circumference the pipe to allow fluids or chemicals to be dispersed from the pipe into the tank body 20. The gel line 50 may also comprise a discharge port 58 at a second end of the pipe. Chemicals or fluids may be injected through the manifold port 54 and the gel line 50 to mix with and treat the fracturing fluids that have settled in the tank body 20.

With continued reference to FIG. 1, the sand filter 14 and the three-phase separator 16 are preferably disposed adjacent the tank 12, proximate the riser. The sand trap 14 is preferably supported on a mechanical 60 lift on the trailer 18 to allow the sand separator to be moved to a horizontal position to allow with regulations regulating the height of a towed vehicle. Preferably, a hydraulic cylinder 62 is used to move the sand trap 14 between an operable and towing position. The sand trap 14 and the separator 16 are connected between the riser at the well head and the tank 12 so that fluids from the well head can be directed through the sand trap, the separator, or both before being directed to the tank.

Figure 3:
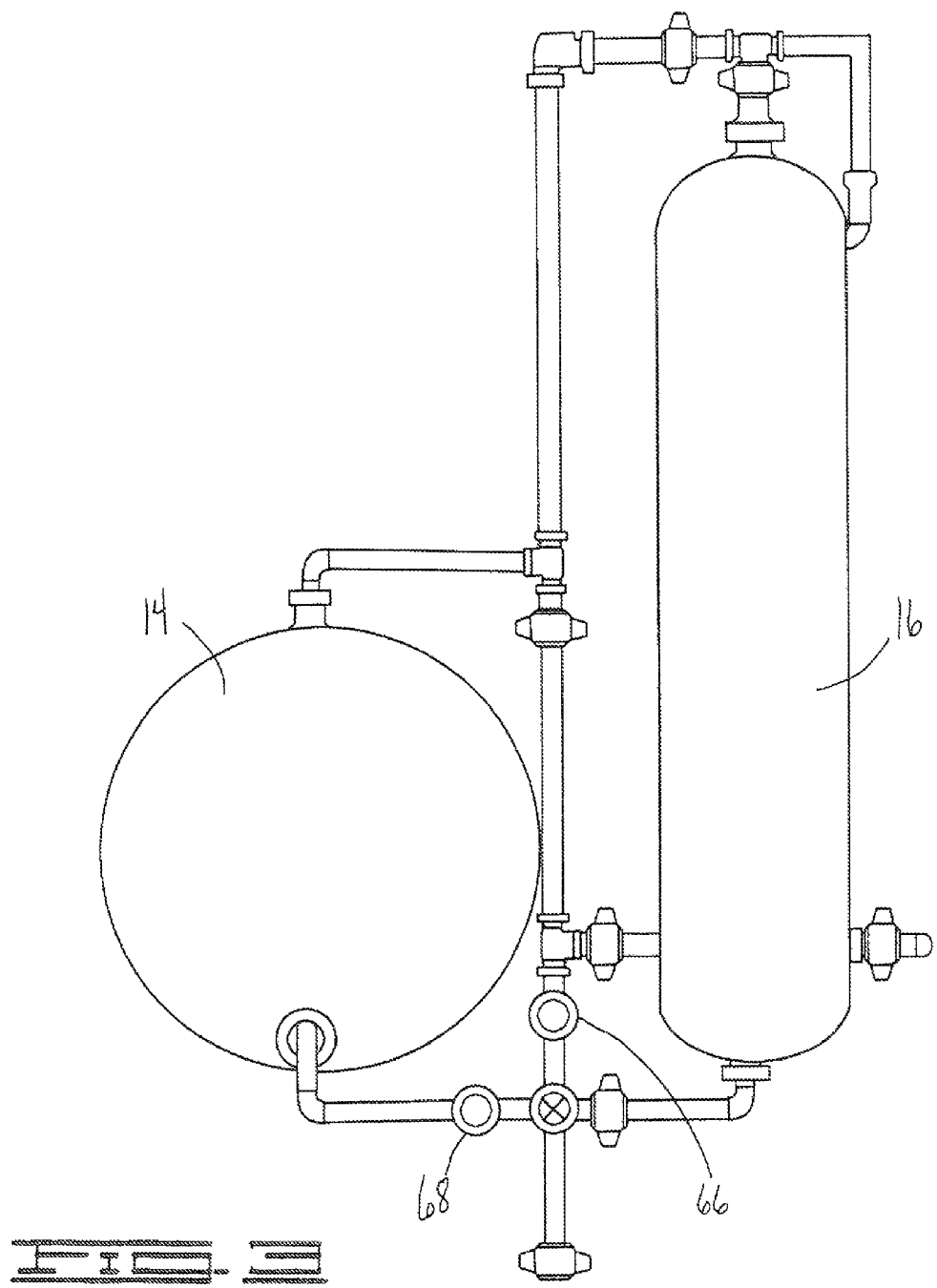
FIG. 3 is a front elevation of the separator and sand trap used with the system of FIG. 1.

Turning now to FIG. 3, an end view of the sand trap 14 and the separator are shown. The series of pipe connections include a sand plug valve 66 and a separator plug valve 68. The sand plug valve 66 is disposed proximate the sand trap 14 and operates to control flow to the sand trap. The separator plug valve 68 is disposed proximate the separator 16 and operates to control flow to the separator.

Liquid flow may be diverted through the sand trap 14 when a heavy presence of sand has been determined to be in any given well. Flowing through the sand separator 14 allows heavy sand to be trapped before it enters into the tank 12 thus reducing the amount of damage to equipment associated with sand wash. Well liquids may also be routed to the three phase separator 16 only to allow for the liquid to be separated into three separate dump lines when there is no heavy sand.

Liquid flow may also be routed through both the sand separator 14 and the three-phase separator 16 by open both the sand plug valve 66 and the separator plug valve 68. This allows sand to be separated first and then passing the remaining liquid to the three phase test separator 16 where gas, water and oil would be separated and diverted through three separate lines. Gas will vent to a meter run 70 on the test separator and out to the remote flare. Oil would be diverted to a holding tank or storage tank (not shown) and water will be directed to the tank.

Various modifications can be made in the design and operation of the present invention without departing from its spirit. Thus, while the principal preferred construction and modes of operation of the invention have been explained in what is now considered to represent its best embodiments, it should be understood that within the scope of the appended claims, the invention may be practiced otherwise than as specifically illustrated and described.

The invention claimed is:

1. A tank system for capturing fluids from a well, the system comprising:
    a tank body, the body comprising:
        a main inlet port proximate a top portion of the tank body; and
        a vent port disposed on a top of the tank body;
    a gas buster line disposed within the tank body, the line comprising:
        a first pipe section having a length and a diameter, the first pipe section connected at a first end to the main inlet port; and
        a second pipe section having a length and a diameter, the second pipe section connected at a first end to a second end of the first pipe section;
        wherein the length of the second pipe section is greater than the length of the first pipe section and the diameter of the second pipe section is greater than the diameter of the first pipe section; and
        wherein the second pipe section is characterized by a plurality of slots cut in a circumference of the pipe section, the slots allowing fluids in the second pipe section to disperse out of the second pipe section;
    a flare line operatively connected to the vent port, the flare line comprising:
        at least one pipe section having an end connected to the vent port;
        a check valve connected to the at least one pipe section; and an ignition system connected to the at least one pipe section and adapted to burn gases passing through the at least one pipe section.

2. The tank system of claim 1 further comprising:

a pipe section having a first end connected to the main inlet port; and a sand trap operatively connected to a second end of the pipe section connected to the main inlet port.

3. The tank system of claim 1 further comprising:

a pipe section having a first end connected to the main inlet port; and a separator operatively connected to a second end of the pipe section connected to the main inlet port.

4. The tank system of claim 1 further comprising:

a pipe section having a first end connected to the main inlet port;

a separator having an inlet port and an outlet port, the outlet port operatively connected to a second end of the pipe section connected to the main inlet port; and a sand trap having an inlet port and an outlet port, the outlet port operatively connected to inlet port of the separator.

5. The tank system of claim 1 wherein the gas buster further comprises a third pipe section having a length and a diameter, the third pipe section connected at a first end to a second end of the first pipe section and connected at a second end to the first end of the second pipe section;

wherein the length of the third pipe section is greater than the length of the first pipe section and the diameter of the third pipe section is greater than the diameter of the first pipe section; and wherein the diameter of the third pipe section is less than the diameter of the second pipe section.

6. The tank system of claim 1 wherein the tank body further comprises:

a second inlet port proximate a bottom portion of the tank body; and a gel line operatively connected to the second inlet port and adapted to disperse fluids into the tank body.

7. A tank system for capturing fluids from a well, the system comprising:

a trailer;

a tank body supported on the trailer, the body comprising:

a main inlet port proximate a top portion of the tank body; and a vent port disposed on a top of the tank body;

a gas buster line disposed within the tank body, the line comprising:

a first pipe section having a length and a diameter, the first pipe section connected at a first end to the main inlet port; and a second pipe section having a length and a diameter, the second pipe section connected at a first end to a second end of the first pipe section;

wherein the length of the second pipe section is greater than the length of the first pipe section and the diameter of the second pipe section is greater than the diameter of the first pipe section; and wherein the second pipe section is characterized by a plurality of slots cut in a circumference of the pipe section, the slots allowing fluids in the second pipe section to disperse out of the second pipe section;

a flare line operatively connected to the vent port, the flare line comprising:

at least one pipe section having an end connected to the vent port;

a check valve connected to the at least one pipe section; and an ignition system connected to the at least one pipe section and adapted to burn gases passing through the at least one pipe section;

a pipe section having a first end connected to the main inlet port;

a separator supported on the trailer, the separator having an inlet port and an outlet port, the outlet port operatively connected to a second end of the pipe section connected to the main inlet port; and a sand trap supported on the trailer, the sand trap having an inlet port and an outlet port, the outlet port operatively connected to inlet port of the separator.

\* \* \* \* \*